(12) United States Patent
Federspiel

(10) Patent No.: US 9,621,876 B2
(45) Date of Patent: Apr. 11, 2017

(54) SCANNING 3D IMAGER

(75) Inventor: Laurent Federspiel, Canach (LU)

(73) Assignee: IEE International Electronics & Engineering S.A., Echternach (LU)

( * ) Notice: Subject to any disclaimer, the term of this patent is extended or adjusted under 35 U.S.C. 154(b) by 871 days.

(21) Appl. No.: 13/697,381

(22) PCT Filed: May 5, 2011

(86) PCT No.: PCT/EP2011/057192
§ 371 (c)(1),
(2), (4) Date: Jan. 18, 2013

(87) PCT Pub. No.: WO2011/144454
PCT Pub. Date: Nov. 24, 2011

(65) Prior Publication Data
US 2013/0107016 A1    May 2, 2013

(30) Foreign Application Priority Data

May 17, 2010 (LU) .......................... 91688

(51) Int. Cl.
H04N 13/02    (2006.01)
H04N 1/03    (2006.01)
(Continued)

(52) U.S. Cl.
CPC ......... *H04N 13/0253* (2013.01); *G01S 17/89* (2013.01); *G01S 7/4817* (2013.01); *G01S 7/4863* (2013.01); *G02B 26/105* (2013.01)

(58) Field of Classification Search
CPC ................................................ H04N 13/0275
(Continued)

(56) References Cited

U.S. PATENT DOCUMENTS 8,530,811 B2 *  9/2013  Molnar ................... G01S 3/782
                                                    250/206.1
2006/0182217 A1   8/2006  Harding et al.
(Continued)

FOREIGN PATENT DOCUMENTS

DE    4440613 C1    7/1996
GB    2441162 A     2/2008
JP    2007033277 A  2/2007

OTHER PUBLICATIONS

Chinese Office Action issued Sep. 19, 2014 re: Chinese Application No. 201180024613.3; citing: CN 1756508 A and CN 101529273 A.
(Continued)

*Primary Examiner* — Paulos M Natnael
*Assistant Examiner* — Justin Sanders
(74) *Attorney, Agent, or Firm* — Reising Ethington P.C.

(57) ABSTRACT

A scanning 3D imager for recording images of a scene comprises a light source configured to emit a fan-shaped pulsed light beam with linear cross section, a scanning mirror arranged in the light path of the light beam to guide the light beam into the scene and to successively illuminate slices of the scene by sweeping the light beam through the scene transversally to the linear cross section thereof, and an imager chip arranged to receive light from the scene via the scanning mirror, the imager chip comprising an photosensor array disposed in such a way that the illuminated slices of the scene are successively imaged thereon.

14 Claims, 2 Drawing Sheets

(51) Int. Cl.
*G01S 17/89* (2006.01)
*G01S 7/481* (2006.01)
*G01S 7/486* (2006.01)
*G02B 26/10* (2006.01)

(58) Field of Classification Search
USPC .......................................................... 348/49
See application file for complete search history.

(56) References Cited

U.S. PATENT DOCUMENTS

| | | | |
|---|---|---|---|
| 2006/0192086 A1* | 8/2006 | Niclass | H01L 31/107 |
| | | | 250/214.1 |
| 2009/0190007 A1* | 7/2009 | Oggier | G01S 17/89 |
| | | | 348/241 |
| 2010/0168579 A1 | 7/2010 | Prater | |
| 2010/0214654 A1* | 8/2010 | Birk | G01J 1/44 |
| | | | 359/385 |

OTHER PUBLICATIONS

International Search Report, International Application No. PCT/EP2011/057192; International Application Filing Date May 5, 2011; Mail date Jun. 27, 2011.

Written Opinion, International Application No. PCT/EP2011/057192; International Application Filing Date May 5, 2011; Mail date Jun. 27, 2011.

* cited by examiner

SCANNING 3D IMAGER

TECHNICAL FIELD

The present invention relates to a scanning 3D imager, in particular such an imager that operates according to the time-of-flight (ToF) measurement principle.

BRIEF DESCRIPTION OF RELATED ART

Systems for creating a three-dimensional (3D) representation of a given portion of space have a variety of potential applications in many different fields. Examples are automotive sensor technology (e.g. vehicle occupant detection and/or classification), automation technology, or surveillance technology (e.g. plant monitoring, people counting, access control and pedestrian detection), to name only a few.

According to the ToF distance measurement principle, a light signal is emitted into the scene of interest and the time between the emission and the echo-return of the emitted signal is measured. The corresponding distance is proportional to the measured time-of-flight. For the purposes of the present description, the term "light" is to be understood as including visible, infrared (IR) and ultraviolet (UV) light.

Today, different 3D imaging techniques using the ToF measurement principle exist. They are briefly presented hereinafter.

3D Cameras

Monocular 3D cameras based on time-of-flight distance measurement are known since 1994 from the work of Seitz and Spirig, see e.g. DE 4440613. Seitz and Spirig proposed a special image sensor matrix on which the scene is imaged. Every pixel in this matrix performs a measurement of the phase shift between (sinusoidally) amplitude-modulated light emitted by a modulated light source and the amplitude-modulated light reflected from the scene under observation. This technique is sometimes referred to as the "phase-shift technique". This analog ToF measurement technique is subject to many measurement errors that require special measures to correct them.

Light diffusion in atmosphere or in the optical system need to be considered because the measured distance (proportional to the phase shift) is a weighted average of all the modulated light reaching the image sensor, possibly on various ways and over multiple reflections. In order to achieve high measurement accuracy, a long photon collection time is thus needed. This implies, in turn, that many "background" photons (light not stemming from the light source of the amplitude-modulated light), e.g. from the sun or other uncontrolled light sources, will influence the measurement. Background light suppression is theoretically possible but proves to be difficult to implement. The modulated light source thus needs very high power in order to enable the system to cope with ambient light. This high power light requirement represents a major disadvantage for many applications. The typical performance of this technology is a frame repetition rate of about 10 images per second with more than 10000 pixels resolution and complete X-Y images with depth information for each pixel. The major disadvantage is the very high power of the IR light source.

LIDAR

LIDAR or LADAR are known to perform accurate ToF distance measurements by the emission of short laser pulses followed by the detection of backscattered light. Imaging features of such devices were typically limited to scanning one or two planes by using a rotating polygonal mirror. The time-of-flight is normally measured by so-called TDCs, time-to-digital convertors. Digital distance measurement offers the advantage of higher accuracy and reduced influence of ambient light, because the measurement time for a specific spot of the scene is very short, maximum 1 ns per distance interval of 15 cm. The laser light illumination of the specific spot under observation is much brighter than the contribution of the ambient light accumulated during the time of the measurement. LADAR instruments, which are mainly used in military applications and in scientific experiments, are traditionally expensive. Imaging performance is poor and the time required for recording a complete image very long.

Oscillating Mirror Scanners

A kind of lower-cost imaging LADAR is made by using oscillating mirrors to direct the light pulse sequentially onto various spots of the scene under observation. The scanning-mirror ToF technology avoids some of the traditional problems of analog phase shift measurement. Some implementations enable the recording of complete 2D images with distance information (i.e. 3D images).

So-called galvano-mirrors have been known for a long time in laser deflection applications. Modern mirrors can be produced at much lower cost using photolithographic processes. Such micro-electro-mechanical system (MEMS) mirrors can be operated in air or in vacuum.

The power of the emitted laser light pulse is limited by cost and eye safety rules. To cover a significant distance, and to be sensitive to low reflectivity surfaces, a camera needs a minimum aperture to collect enough light coming back from scene. The optical aperture is limited by the mirror size. Thus from the optics point of view, the ideal mirror must be large.

From the mechanical point of view, the ideal mirror would have only a few tenths of wavelengths in diameter. Larger mirrors have a mass versus stiffness conflict. The resonating frequency of the mass-spring (mirror mass and torsion spring of the rotation axis) is inversely proportional to the mass. Therefore, a high scanning frequency requires a very low mirror mass. On the other hand, image quality needs a well-defined mirror surface shape; this means high stiffness, which requires a thick, i.e. heavy, mirror.

The highest reasonable mirror scanning frequency is the resonance frequency of the mass-spring system. This coincides with minimum drive power needs for a given scan angle, using a sine function to drive the mirror. If a two-dimensional scan is needed, one uses either two different MEMS mirrors that have a single tilting axis each or a MEMS mirror having two different tilting axes. The resulting two-dimensional scanning curve describes a Lissajou figure in the scene. It is a result from the sine shape that scan trace density is much higher at the edge of the image than at the centre. This means, in turn, that the scan time efficiency is low (below about 20%). This strongly affects the maximum frame rate—pixel density product.

A frame rate of at least 10 complete 2D images per second requires mirror oscillation frequencies above 20 kHz. A mechanically stable mirror will thus be limited to a few millimeters in diameter, resulting in a poor optical aperture. This technique has an obvious problem to achieve simultaneously high 2D resolution, high frame rate and a significant distance range. This type of 3D imager is thus typically limited to a distance range of about 10 m and/or an image resolution of less than 10000 pixels.

Solid State Digital ToF Imagers

Another ToF imaging technology combines the advantage of a pixel sensor matrix with the ToF measurement accuracy of the LIDAR. The entire scene is simultaneously illuminated by a short laser pulse. The reflected pulse is detected and the time delay is measured by TDCs that are associated to each pixel of an imager chip. 32×32 pixel imagers have been demonstrated. Nevertheless, the major problem is to achieve high-resolution chips, because TDC and other circuitry limits the available photo-sensitive area. Also, deep local storage structures for multiple event handling as well as data access busses are in conflict with optimal photon sensitivity and high image resolution. Another problem of such a setup is the high power of the laser flash needed to illuminate the entire scene at once.

Many problems, e.g. in the fields of automation or surveillance, could be solved by sensors delivering a dynamic 3D image of the specific scene. In general, today's bottleneck is not in computing power but in available real-time information for the computer.

3D imager delivering high resolution images at a high frame repetition rate and reliably measuring the distance (range) to every spot of the scene under observation would be a major progress for vision sensing techniques. A typical application example of such an imager would be traffic monitoring. Correct classification of all kinds of vehicles, pedestrians and/or other road users requires high resolution. Due to the relatively high speed of the vehicles a high frame rate is needed. Operation in bright sunlight demands very high ambient light immunity. Thousands of other applications would welcome such a type of 3D camera.

BRIEF SUMMARY

The invention provides a 3D imager with improved performance.

According to the invention a scanning 3D imager for recording images, such as, e.g., ToF-based range images, of a scene comprises a light source configured to emit a fan-shaped pulsed light beam with linear cross section, a scanning mirror arranged in the light path of the light beam to guide the light beam into the scene and to successively illuminate slices of the scene by sweeping the light beam through the scene transversally to the linear cross section, and an imager chip arranged to receive light from the scene via the scanning mirror, the imager chip comprising an photosensor array disposed in such a way that the illuminated slices of the scene are successively imaged thereon.

As will be appreciated, the fact that only a slice (i.e. a substantially one-dimensional part of the scene) of the scene is illuminated at a time makes it possible to use a linear photosensor array, i.e. an array of photosensors arranged on a straight line, as the photosensor array. The photosensor array may comprise a single linear photosensor array. Alternatively it may comprise at least two linear photosensor arrays arranged in parallel to one another. Only a slice of the scene being illuminated at a time thus allows using one lines (or a few lines) of photosensor. This leaves plenty of room next to the photosensors for TDCs and storage circuitry. The photosensor array may therefore be considered as essentially one-dimensional.

Preferably, the light source is a pulsed laser source, a LED or an assembly of a plurality of LEDs, including means (e.g. a cylindrical lens, or a curved mirror, or a combination thereof) to fan-shape the pulsed light beam. As will be appreciated, the pulse power needed to illuminate just one line (or column) of the scene is of course moderate, e.g. about 100 times smaller than the pulse power needed for full scene illumination.

During operation, the 3D imager illuminates the scene slice after slice. As the scanning mirror oscillates about its tilting axis, the fan-shaped light beam is swept through the scene transversally (preferably perpendicularly) to the main direction of extension of the linear cross section of the light beam. The combination of the preferably essentially one-dimensional photosensor array and the scanning movement carried out by the moving mirror placed in the light path allows obtaining complete images of the scene, the images being 3D images in the sense that they have pixels disposed in rows and columns, each pixel comprising distance information.

The scan can be done at a low frequency, e.g. below 1 kHz. A reasonable frame repetition rate can even be obtained at 25 Hz, whereas more than 10 kHz were needed for a fully mechanical 2D scan. The scanning mirror can thus be relatively large, leading to good optical aperture and an easily controllable, well-defined, time function of the angular motion. Also, thanks to the lower scanning frequency, the time spans, during which the sensor points to specific slices of the scene is quite long. Together with the improved optical aperture, this leads to a longer distance range (i.e. the range from the smallest to the largest measurable distance) of this 3D imager, compared to the conventional 3D imagers. The 3D imager according to the invention thus may be implemented to achieve high resolution with a simple imager chip and a simple low-frequency oscillating mirror. The light source may be operated with reasonable pulse power at low repetition rate. With 1000 light pulses (or light flashes) per mirror sweep and 50 sweeps per second, the time span allows a distance range of more than 100 meters to be covered. Resolutions above VGA format, even HD, become feasible with a 1000-pixel photosensor line on the imager chip.

The virtually unlimited space next to each individual photosensor enables evaluation circuit designs with complex functionality. Accordingly, the evaluation circuitry is preferably configured in such a way that every light pulse received gets its individual time stamp even if light reflections from one spot of the scene are received in a close sequence. The memory stack is preferably designed with a depth sufficient to handle the targeted scenes and situations, including raindrops or insects in the light path. Such events are preferably filtered out during the post-processing of the recorded image data.

The evaluation circuitry is preferably arranged close to the photo-sensitive area of the photosensor, because subnanosecond reaction times are typically required to achieve the targeted accuracy in the distance measurement. The imager chip may be made using a standard silicon substrate. However, other substrates, e.g. silicon-germanium, may be used to implement very fast circuitry and thus to improve the performance of the imager.

Photosensors for very fast detection of individual photons are known, e.g. the so-called SPADs (single photon avalanche diodes). Photo-sensitivity of SPADs is high as single photons lead to a detectable discharge (countable and tagged with a time stamp) in the semiconductor. Optionally, individual micro-lenses on top of the semiconductor focus the light on the most sensitive area, which increases the effective optical fill factor.

For best sensitivity, avalanche photosensors are operated close to the break-through voltage. By using the dark rate during laser flash pauses, this voltage can be individually and dynamically adjusted to compensate sensor differences, temperature and lifetime drifts.

One geometrical pixel of the imager chip can group plural individual photosensors in order to improve the production yield, the fill factor and even the dynamic light intensity range, while detected pulses may still be processed individually.

The imager chip may be configured to obtain not only distance information but also light intensity information; in this case the images produced contain (e.g. ToF-based) distance and intensity information.

The wavelength of the light source is may be selected in the visible or invisible spectrum. Preferably, the light source is configured to operate in the infrared spectral region. The 3D imager may be equipped with plural light sources operating at different wavelength to enable computation of colour images together with 3D contour images or to perform remote material analyses. The combination of wavelengths may be done in accordance with the needs of the application.

The scanning mirror preferably comprises a micro-mechanical mirror (MEMS mirror) configured for oscillation at resonance. Alternatively, the scanning mirror could also be a (polygonal) rotating mirror.

According to a preferred embodiment of the invention, the 3D imager comprises a deflection mirror to deflect light from the scene to the imager chip, the deflection mirror having a slit therein, which the light beam is passed through.

Preferably, the imager comprises imaging optics, such as e.g. a cylindrical lens, to image the illuminated slices of the scene onto the photosensor array.

To fan out the light beam, the light source could also comprise a further scanning mirror. In average, this further scanning mirror would fan out the beam along a first direction, whereas the scanning mirror mentioned before would scan the fan-shaped beam through the scene.

A preferred aspect of the invention concerns a computer vision system comprising an imaging device as described hereinabove as well as a processor operatively connected to the imaging device to process the image data.

BRIEF DESCRIPTION OF THE DRAWINGS

Further details and advantages of the present invention will be apparent from the following detailed description of not limiting embodiments with reference to the attached drawings, wherein.

DETAILED DESCRIPTION

Figure 1:
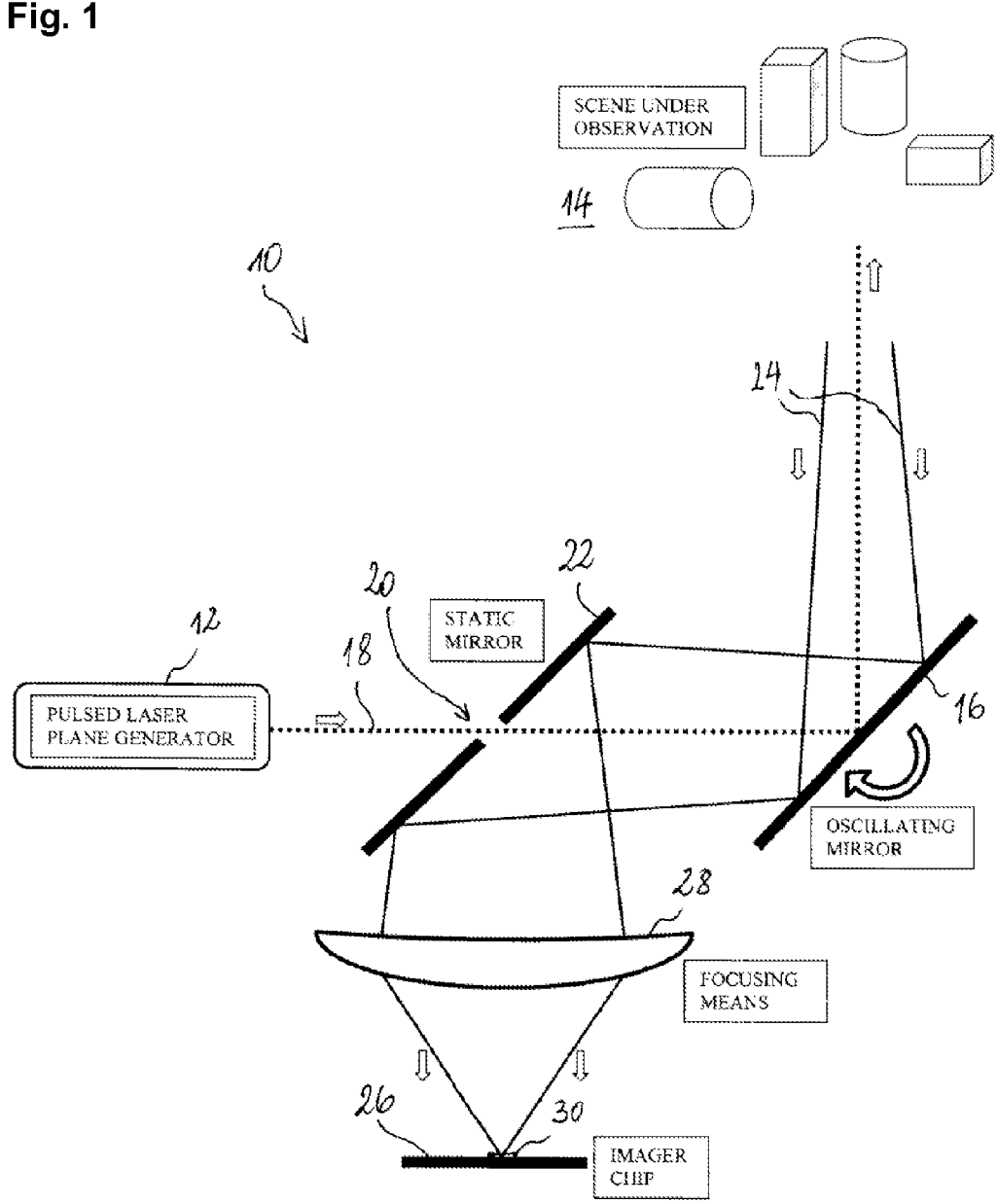
FIG. 1 is a schematic view of a scanning 3D imager according to a preferred embodiment of the invention.

FIG. 1 shows a scanning 3D imager 10, comprising a pulsed laser source 12 as a light source. The pulsed laser beam is fanned out with a cylindrical lens (not shown) and directed into the scene 14 to be imaged by means of an oscillating scanning mirror 16 arranged in the light path of the laser beam 18. The laser beam thus successively illuminates slices of the scene 16 as it is swept through the scene transversally to the plane in which the laser beam has been fanned out. In FIG. 1, the laser beam 18 is fanned out perpendicular to the plane of the sheet. Between the pulsed laser source 12 and the oscillating mirror, the fan-shaped laser beam passes a slit 20 arranged in a static deflection mirror 22 arranged at 45°, which directs light that is scattered back 24 from the scene 14 onto an imager chip 26. A cylindrical focusing lens 28 focuses oriented in such a way that the illuminated slices of the scene are imaged thereon.

Figure 2:
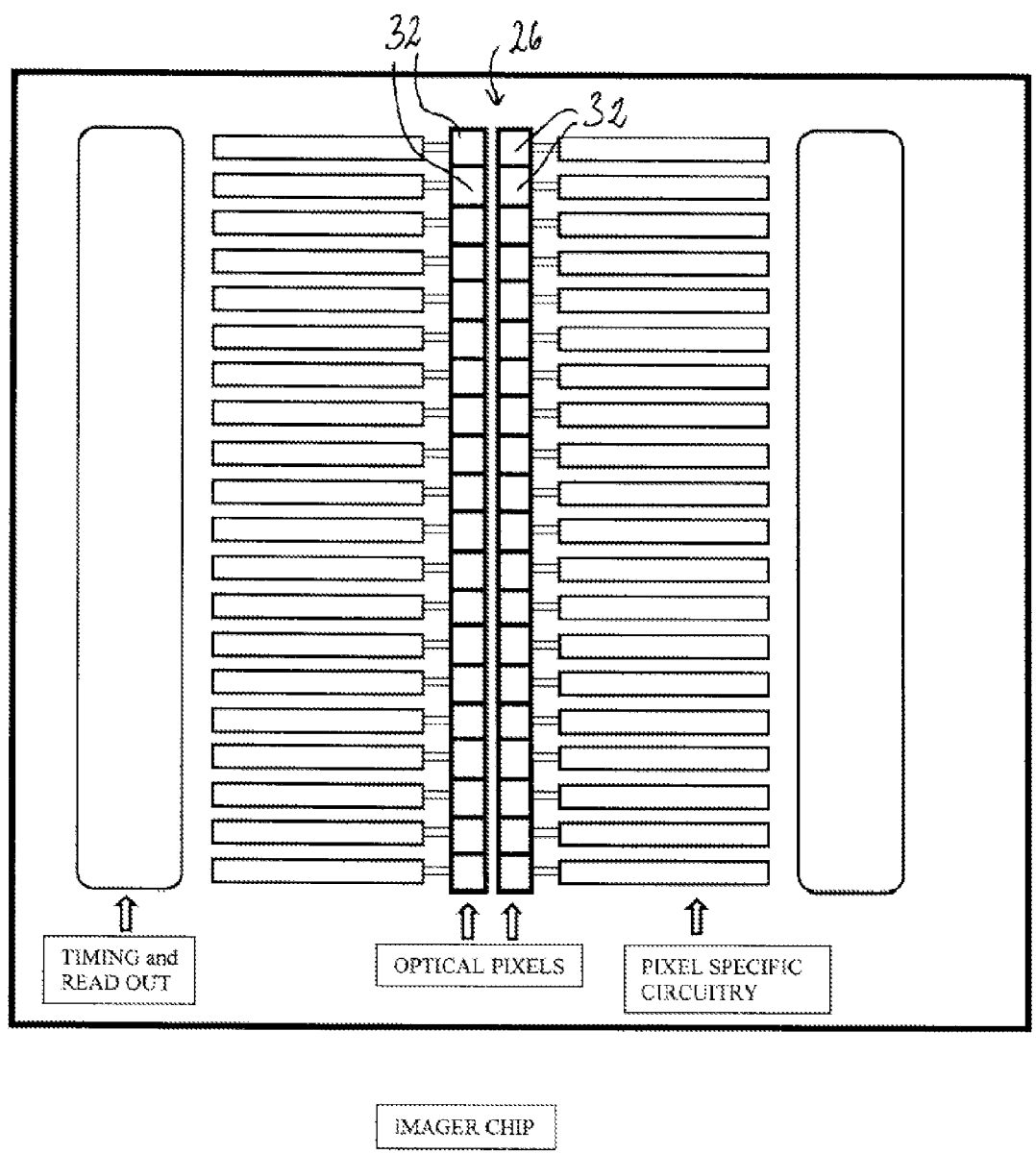
FIG. 2 is a schematic view of an imager chip for a scanning 3D imager according to the invention.

FIG. 2 schematically shows the imager chip 26 of the 3D imager 10. The individual photosensors 32 are disposed in two parallel lines to form the essentially one-dimensional photosensor array 26. Each photosensor 32 is operatively connected to its specific circuit 34 (e.g. a TDC). Timing and read-out circuits 36 are provided to control and synchronize operation of the photosensors 32, and to read out the different measurement values.

Each photosensor 32 and its associated circuit 34 measures the duration between a reference point in time (the time of emission of a laser pulse) and the instant when the return pulse from the scene hits the photosensor 32.

The scanning mirror 16 is in the example of FIG. 1 a resonance-type micro-mechanical mirror.

The photosensors 32 are preferably SPADs (Single Photon Avalanche Diodes). All peripheral components which are required to run and control the SPADs no longer play a role in fill factor calculation, as they are placed left or right of the photosensitive area. Advantageously, the photosensor array 26 comprises more than 1000 individual photosensors per line. Resolutions in the mega-pixel range thus become feasible also with ToF imagers.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. Scanning 3D imager, for recording images of a scene, said imager comprising
a light source configured to emit a fan-shaped pulsed light beam with linear cross section along a light path;
a scanning mirror arranged in said light path of said light beam to guide said light beam into said scene and to successively illuminate slices of said scene by sweeping said light beam through said scene transversally to said linear cross section; and
an imager chip arranged to receive light from said scene via said scanning mirror, said imager chip comprising an photosensor array disposed in such a way that said illuminated slices of said scene are successively imaged thereon,
a deflection mirror to deflect light from said scene to said imager chip, said deflection mirror having a slit therein, which said light beam is passed through, wherein the scanning 3D imager is structured to obtain a 3D image of the scene comprising pixels disposed in rows and columns, each pixel comprising distance information.

2. Scanning 3D imager as claimed in claim 1, wherein said photosensor array is a linear photosensor array.

3. Scanning 3D imager as claimed in claim 1, wherein said photosensor array comprises at least two, preferably two, linear photosensor arrays arranged in parallel to one another.

4. Scanning 3D imager as claimed in claim 1, wherein said photosensor array comprises an avalanche diode array.

5. Scanning 3D imager as claimed in claim 1, wherein said scanning mirror comprises a micro-mechanical mirror.

6. Scanning 3D imager as claimed in claim 1, comprising a deflection mirror to deflect light from said scene to said imager chip, said deflection mirror having a slit therein, which said light beam is passed through.

7. Scanning 3D imager as claimed in claim 1, wherein said light source is a laser source and wherein said light beam is a laser beam.

8. Scanning 3D imager as claimed in claim 1, wherein said light source is a LED.

9. Scanning 3D imager as claimed in claim 1, comprising imaging optics to image said illuminated slices of said scene onto said photosensor array.

10. Scanning 3D imager as claimed in claim 1, wherein said light source comprises a cylindrical lens to bring said light beam into fan-shape.

11. Scanning 3D imager as claimed in claim 1, wherein said light source comprises a further scanning mirror to fan out said light beam.

12. Scanning 3D imager as claimed in claim 1, wherein each one of the individual photosensors of the photosensor array is connected to an individual TDC.

13. Scanning 3D imager as claimed in claim 4, wherein said avalanche diode array comprises an array of SPADs.

14. Computer vision system comprising an scanning 3D imager as claimed in claim 1 as well as a processor operatively connected to said scanning 3D imager to process image data received from said scanning 3D imager.

* * * * *